Patented Nov. 23, 1926.

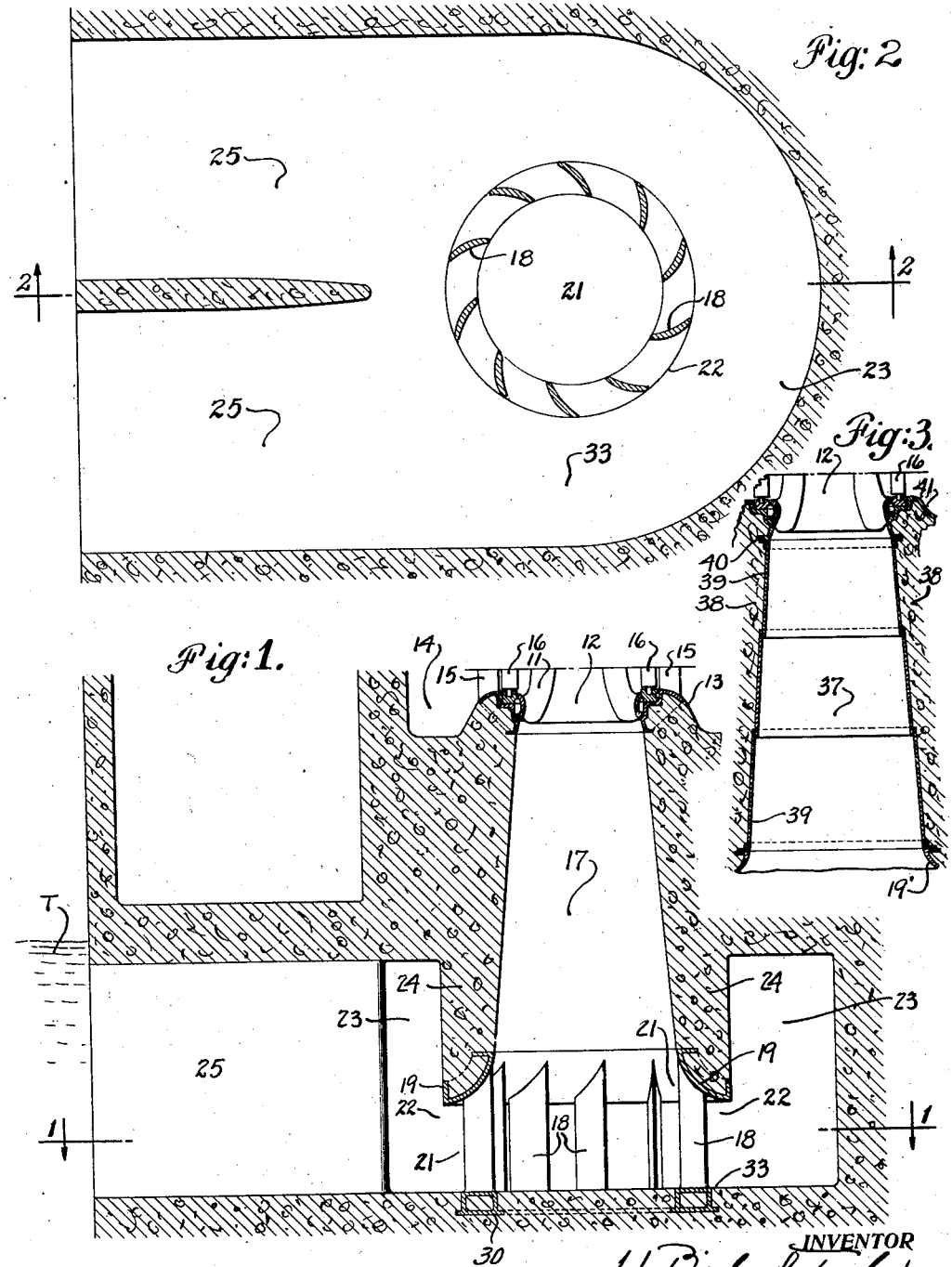

1,608,259

UNITED STATES PATENT OFFICE.

HARVEY BIRCHARD TAYLOR, OF PHILADELPHIA, PENNSYLVANIA.

HYDRAULIC TURBINE.

Original application filed July 24, 1917, Serial No. 182,498. Divided and this application filed December 18, 1924. Serial No. 756,629.

The principal object of my invention is to provide a new and improved substructure for a hydraulic turbine of the inflow type and particularly to such a turbine having a straight draft tube receiving the discharge from the runner. Another object of my invention is to provide suitable supporting means for such a turbine and its associated masonry structure. Another object is to make a stay vane ring to go in the draft conduit of such a turbine. Still another object of my invention is to provide columns or piers in the draft conduit beneath such a turbine that shall be effective as supports for the superposed structure and at the same time have the proper disposition as vanes with respect to the water flow in the conduit. These and other objects of my invention will be made apparent in the following disclosure of a limited number of examples of forms in which the invention may be embodied.

In the accompanying drawings illustrating the invention,

Figs. 1 and 2 are vertical and horizontal sectional views respectively of a turbine structure embodying the invention, and Fig. 3 is a view similar to Fig. 1 but illustrating a modification.

The turbine runner 12 has vanes 11 and is of the vertical shaft type. The supply conduit 13 terminates in a spiral or volute portion 14 surrounding the runner 12. A speedring 15 is provided directing the flow to the adjustable guide vanes 16 so that the entering flow has a whirl imparted to it around the axis of the runner as a center.

Directly below the runner 12 there is an ordinary straight draft tube 17 with vertical axis. Below this is a stay vane ring having the vanes 18 extending across the annular flaring conduit between the crown ring 19 and the bottom wall 33. The surfaces of the crown ring 19 and bottom wall 33 are surfaces of revolution forming between them a passage 21 receiving the flow in substantially axial direction from the straight draft tube 17 and turning it outward to the radial or horizontal direction and at the same time lowering both the meridan and whirling velocity components and thus acting as a diffuser to create a suction or draft lowering the back pressure on the draft tube 17. The passage 21 has an annular outlet 22 into a chamber 23 which extends upwardly around the barrel formation 24 of the lower end of the draft tube 17. This chamber 23 (Fig. 2) is of simplified construction and avoids any complicated shape for regaining the whirl component of the discharge from the draft tube 17, 21, the greater portion of the kinetic energy of the water being recovered by the draft tube before the water enters the collector. The water is then conducted through the discharge passage 25 to the tailwater T, a slight further deceleration being effected in the collector and discharge passage.

The draft tube of this invention may be arranged to operate either with the chamber 23 and discharge passage 25 compleely submerged as shown in Fig. 1, or with the tail water surface reduced to an elevation below the top of this chamber where the tailwater level T is such hat there is a free surface of tailwater within the chamber.

The stay vanes 18 are designed to assist in the hydraulic operation of gradually reducing the velocity of the water while flowing between the vanes. For this purpose they are suitably curved to receive the water in its natural direction of flow and to provide a gradually increasing cross sectional area measured perpendicularly to the stream elements between neighboring vanes. In this way the natural diffuser or decelerating action of the annular passage 21 is smoothly and symmetrically maintained. As will be apparent from Fig. 1 the diameter of the draft tube 17 increases uniformly going downward until the level of the upper edge of the crown ring 19 is reached and then the diameter enlarges at an increasing rate for further positions below. Thus it is apparent that the draft tube shown in Fig. 1 flares increasingly as it approaches the bottom wall 33 in which the base ring 30 is embedded.

In the embodiment of the invention disclosed in Fig. 3 the general design is much the same as for Figs. 1 and 2 but in Fig. 3 the draft tube 37 is formed not merely as a void in the concrete structure 38 but has a sheet metal lining 39 which stands on the crown ring 19' of the stay ring. At its upper end this sheet metal draft tube lining 39 has a flange attached to the base ring 40 of the speed ring. In this embodiment of my invention I have also shown a metal turbine casing 41 for the supply water conduit in place of the conduit formed in the concrete used in preceding figures. The weight of the turbine and other parts is carried by the concrete surrounding the tube 37 to the stay ring and thence to the foundation. The plate steel lining 39 serves merely as a form for setting the concrete and lining for the tube and is not essential as a part of the structure carrying this superposed load.

In the turbine structure of this invention the whirling draft tube discharge is received in a straight draft tube with gradually diverging walls adapted to decelerate the meridian velocity of the flow and the lower end of this draft tube is provided with a diverging passage decelerating both the meridian and whirling components of velocity of the flow so as to further increase the suction and effective head on the runner. At the same time the construction is simple in formation and provides a continuous columnar support from the foundation through to the speed vanes around the runner and thence to the superstructure above.

This application is a division of my application Serial No. 557,921, filed May 2, 1922, now Patent #1,520,783, December 30, 1924, which application, Serial No. 557,921, is a division of my original application Serial No. 182,498, filed July 24, 1917, now Patent #1,490,297, April 15, 1924.

I claim:

1. A draft tube for a hydraulic turbine comprising a straight portion leading to a flaring end portion, a substantially flat floor wall opposite said flaring end portion and forming with said end portion an annular decelerating passage turning the flow from axial toward radial, and a series of stay vanes extending between said floor and said draft tube and inclined from a radial direction so as to conform to whirling lines of flow in the discharge through said draft tube.

2. A draft tube for a hydraulic turbine comprising a straight portion passing through a concrete structure and having its discharge end formed as a hollow concrete barrel portion, a substantially flat floor wall opposite said barrel portion and a stay vane ring supporting said barrel portion from said floor wall, the vanes of said ring being inclined to a radial direction so as to conform to whirling lines of flow to said draft tube.

3. A draft tube for a hydraulic turbine comprising a straight portion leading to a flaring end portion, a substantially flat floor wall opposite said flaring end portion and forming with said end portion an annular decelerating passage turning the flow from axial toward radial, and a series of stay vanes extending between said floor and said draft tube and inclined from a radial direction so as to conform to whirling lines of flow in the discharge through said draft tube and a collector passage receiving the flow from the outlet of said draft tube and having a side wall of generally semi-circular formation spaced from said outlet.

4. In a draft tube for a hydraulic turbine the combination with a downwardly directed barrel portion having a flaring inner surface and a generally cylindrical outer surface, of a floor wall below said barrel portion and forming therewith an annular outwardly directed decelerating passage, and a collector chamber surrounding said passage and receiving the flow therefrom and decelerating said flow on the way to tail water so as to convert the velocity head of the discharge into effective pressure head at the tailwater.

5. A draft tube structure comprising a straight conical passage having a flaring bottom formed in concrete throughout its entire length and having a lining of sheet metal continuous throughout its length.

6. A draft tube structure comprising a straight conical passage formed in concrete throughout its entire length and having a lining of sheet metal comprising a series of overlapping sheet metal sections.

7. A draft tube structure comprising a runner housing formed of metal and set in concrete, and a draft tube extending from said housing formed of concrete and having a sheet metal lining set in the concrete and forming the wall of said draft tube adjacent the runner.

HARVEY BIRCHARD TAYLOR.